March 29, 1949.  H. E. BERNO  2,465,785
PROPELLER SHAFT SUPPORT
Filed April 22, 1947
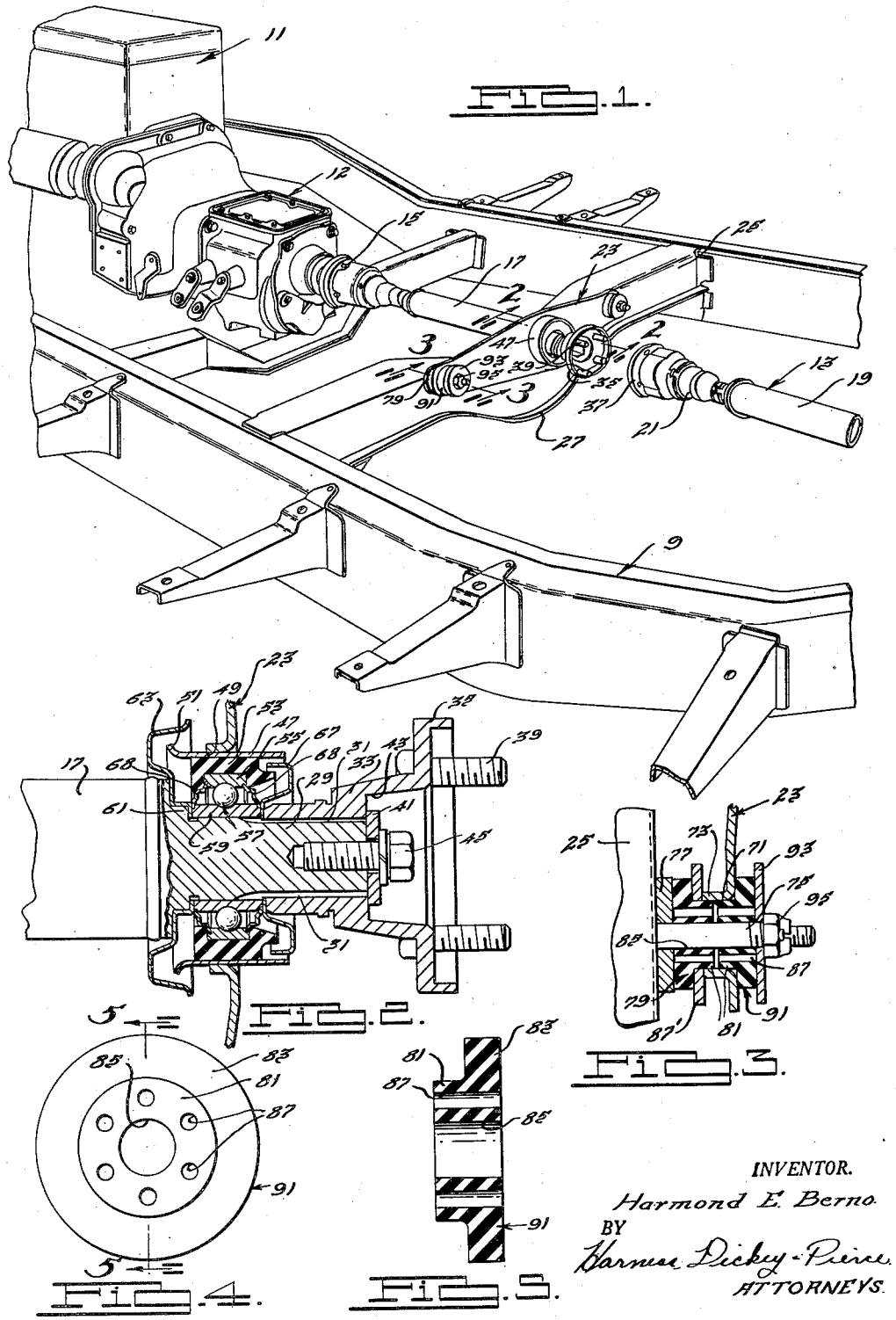
INVENTOR.
Harmond E. Berno
BY
Barnes Dickey-Pierce
ATTORNEYS.

Patented Mar. 29, 1949

2,465,785

UNITED STATES PATENT OFFICE 2,465,785

PROPELLER SHAFT SUPPORT

Harmond E. Berno, Plymouth, Mich., assignor to Kaiser-Frazer Corporation, Willow Run, Mich., a corporation of Nevada Application April 22, 1947, Serial No. 743,021

2 Claims. (Cl. 180—70)

This invention relates generally to motor vehicles, and more particularly to an improved center bearing support for an intermediate portion of a motor vehicle propeller shaft.

The principal object of this invention is to provide an improved bearing mounting construction for resiliently supporting a propeller shaft intermediate its ends, on the frame of a vehicle, which reduces synchronous vibration at both low and high vehicle speeds and dampens the transmission of noise.

Other objects of this invention will become apparent from the following detailed description taken in conjunction with the accompanying drawing in which:

Figure 1 is a perspective view of a portion of the chassis of a motor vehicle illustrating a propeller shaft support thereon which embodies features of this invention;

Fig. 2 is an enlarged sectional view taken substantially along the line 2—2 of Fig. 1;

Fig. 3 is an enlarged sectional view of the structure illustrated in Fig. 1 taken substantially along the line 3—3 thereof;

Fig. 4 is an end elevational view of one of the resilent bushings illustrated in Fig. 3; and Fig. 5 is a sectional view of the structure illustrated in Fig. 4 taken along the line 5—5 thereof.

Referring to the drawing, a chassis frame 9 of an automobile vehicle is partially illustrated having an engine 11 and a change speed transmission 12 mounted thereon in the usual way. The transmission 12 is connected to a differential (not shown) for the rear wheels of the vehicle by means of a split propeller shaft 13, which is connected at its forward end through a two-trunnion type universal joint 15 to the drive shaft of the transmission 12, and at its rear end through a similar universal joint (not shown) to the differential. The propeller shaft 13 is formed of two sections, namely, a forward section 17 which is connected by the universal joint 15 to the drive shaft of the transmission 12, and a rear section 19 which is connected through a universal joint 21 to the forward propeller shaft section 17.

A lever arm, generally indicated at 23, is provided for resiliently supporting the rear end of the forward propeller shaft section 17 on a cross frame member 25 of the chassis. The cross member 25 has an arcuate depressed center portion 27, above which the propeller shaft passes and on opposite sides of which the lever arm 23 is resiliently secured to the frame member 25.

Referring now to Fig. 2, it will be seen that the propeller shaft section 17 has a reduced pilot portion 29 formed on the rear end thereof to which a sleeve 33 of the universal joint is keyed at 31. The sleeve has an attaching flange 35 formed on the rear end thereof which mates with and is connected to a complemental flange portion 37 of the universal joint 21 by means of bolts 39. The sleeve 33 is locked against axial movement with respect to the pilot portion 29 by means of a washer 41 which is received within a recess 43 in the sleeve 33 and which abuts the rear end of the pilot portion 29. The washer 41 is held in position by means of a nut 45 which is threadably received on the end of the pilot portion 29.

The lever arm or propeller shaft bearing support 23 has a tubular sleeve 47 welded in a flanged aperture 49 formed substantially in the center of the lever arm. The forward end of the tubular sleeve 47 is flared outwardly at 51 for a reason which will hereinafter appear. Mounted within the tubular sleeve 47 is a resilient ring 53, formed preferably of rubber or a rubber composition, which is substantially channel-shaped in cross section, as can be seen in Fig. 2. The outer race 55 of a ball-type anti-friction bearing generally indicated at 57, is mounted in the channel portion of the resilient ring 53, and the inner race 59, of the bearing 57, is a close press fit on the pilot portion 29 of the forward propeller shaft section 17. Disposed between the forward face of the inner race 59 and a shoulder 61 in which the pilot portion 29 terminates, is an annular diskshaped member 63 which acts as a mud slinger for preventing the ingress of dirt, mud, and the like. The flared end 51 of the tubular sleeve 47 projects into the channel portion of the member 63 and cooperates with the latter in preventing the ingress of foreign material.

Disposed between the rear face of the bearing inner race 59 and the forward edge of the sleeve 33 is a channel-shaped annular member 67, the outer periphery of which is received within the confines of the tubular sleeve 47 to act as a mud slinger in the same manner as the member 63. Disposed between the opposite side faces of the bearing inner race 59 and the mud slinger members 63 and 67, respectively, are conventional bearing grease retainers 68.

The opposite ends of the lever arm 23 have apertures 71 formed therein so as to provide a tubular sleeve or annular flange 73, surrounding each of the apertures 71. The opposite ends of the lever arm 23 are resiliently mounted on the cross frame member 25 in the same manner, and the mounting of one end is illustrated in detail in Fig. 3. As illustrated therein, a bolt 75 is inserted through an aperture in the cross frame member 25 and received in the center of the aperture 71 in one end of the lever arm 23. A washer 77 is received on the bolt and disposed in an abutting relation with the frame member 25. A resilient bushing 79 is inserted into the lever arm aperture 71 so that its forward end abuts against the washer 77.

The bushing 79 is shown in detail in Figs. 4 and 5, as made of rubber or a rubber composition and comprising an axially extending tubular portion 81 and a ring-like flange 83. The bushing 79 is provided with an axial central bore 85 in which the bolt 75 is received. Surrounding the bore 85 are a plurality of circumferentially spaced apertures 87 which extend longitudinally through the body of the bushing on an axis parallel to the the bore 85, for a reason which will hereinafter appear.

A washer 87' is disposed between the face of the bushing flange 83 and the front edge of the lever arm aperture flange 73, so that the axially extending tubular portion 81 of the bushing extends into the lever arm aperture 71. A resilient bushing 91 is disposed in the opposite side of the aperture 71, which is identical in construction with the bushing 79 and which has the forward face of its flange portion 83 abutting the rear face of the lever arm 23, adjacent the aperture 71. A washer 93 abuts the end of the bushing 91 and is held in place, on the bolt 75, by means of a lock nut 95, so as to resiliently mount the end of the lever arm 23 on the frame member 25, through the resilient bushings 79 and 91. Thus, each end of the lever arm 23 is resiliently mounted on the frame member 25.

The resilient ring 53 which mounts the center bearing 57, and the resilient bushings 79 and 91 which mount the opposite ends of the lever arm on the frame member 25, are preferably made of the same rubber material. However, due to the circumferentially spaced apertures 87 in the resilient bushings 79 and 91 at each end of the lever arm 23, they will be more flexible than the center resilient ring 53. This is important in that if the outer resilient bushings 79 and 91 had the same flexibility and therefore the same resilient and distortional value as the center resilient ring 53, vibration periods would be set up at low vehicle speeds, somewhat the same as if a solid joint were provided for mounting the lever arm 23 to the frame member 25.

If desired, instead of making the bushings 79 and 91 of the same material as the center ring 53, they can be made without the apertures 87, but of a softer rubber than the center ring 53 so that the same relative difference in flexibility between the end resilient bushings and the center resilient ring will be maintained.

It will thus be seen that a propeller shaft bearing support is provided which is resiliently mounted at its ends to a transverse frame member, and which resiliently mounts the propeller shaft in the center thereof, so that vibration will be suitably dampened regardless of the vehicle speed.

I claim:

1. A propeller shaft bearing support including a lever arm, resilient means mounted in the opposite ends of said arm adapted to be connected to a vehicle frame, said resilient means being connected to said arm to resiliently resist movement thereof directly in all directions, a resilient ring mounted in said arm intermediate said ends, an anti-friction bearing having its outer race mounted in said resilient ring and its inner race adapted to be fixed to said propeller shaft for resiliently and rotatably supporting the latter on said vehicle frame, said resilient means being so constructed relative to said resilient ring as to have more flexibility and less resistance to distortion than said resilient ring.

2. A propeller shaft bearing support including a lever arm, tubular sleeve means provided adjacent each end of said arm, opposed resilient bushings mounted in each of said sleeve means, each of said bushings having a plurality of circumferentially spaced apertures therein, bolt means received in each of said bushings for connecting the same to a vehicle frame, said resilient bushings being connected to said arm to resiliently resist movement thereof directly in all directions, tubular sleeve means provided in said arm intermediate its ends, a resilient ring mounted in said last-named tubular sleeve means, an anti-friction bearing having its outer race mounted in said resilient ring and its inner race adapted to be fixed to said propeller shaft for resiliently and rotatably supporting the latter on said vehicle frame, said resilient bushings being so constructed relative to said resilient ring as to have more flexibility and less resistance to distortion than said resilient ring.

HARMOND E. BERNO.

REFERENCES CITED

The following references are of record in the file of this patent:

UNITED STATES PATENTS

| Number | Name | Date |
|---|---|---|
| 1,445,125 | Batenburg | Feb. 13, 1923 |
| 2,212,142 | Austin et al. | Aug. 20, 1940 |
| 2,238,737 | Hunter | Apr. 15, 1941 |
| 2,382,246 | McFarland | Aug. 14, 1945 |